(12) United States Patent
Kato

(10) Patent No.: US 12,475,164 B2
(45) Date of Patent: Nov. 18, 2025

(54) DRAWING SEARCH DEVICE, DRAWING DATABASE CONSTRUCTION DEVICE, DRAWING SEARCH SYSTEM, DRAWING SEARCH METHOD, AND RECORDING MEDIUM

(71) Applicant: CADDi, Inc., Tokyo (JP)

(72) Inventor: Yushiro Kato, Tokyo (JP)

(73) Assignee: CADDi, Inc., Tokyo (JP)

( * ) Notice: Subject to any disclaimer, the term of this patent is extended or adjusted under 35 U.S.C. 154(b) by 0 days.

(21) Appl. No.: 18/757,288

(22) Filed: Jun. 27, 2024

(65) Prior Publication Data
US 2024/0346068 A1 Oct. 17, 2024

Related U.S. Application Data

(63) Continuation of application No. PCT/JP2023/000063, filed on Jan. 5, 2023.

(30) Foreign Application Priority Data

Jan. 5, 2022 (JP) .................................. 2022-000659

(51) Int. Cl.
*G06F 16/535* (2019.01)
*G06F 16/51* (2019.01)
(Continued)

(52) U.S. Cl.
CPC ............ *G06F 16/535* (2019.01); *G06F 16/51* (2019.01); *G06F 16/5846* (2019.01); *G06F 16/5866* (2019.01)

(58) Field of Classification Search
CPC .... G06F 16/535; G06F 16/51; G06F 16/5846; G06F 16/5866
See application file for complete search history.

(56) References Cited

U.S. PATENT DOCUMENTS 5,509,092 A * 4/1996 Hirayama ............ G06V 10/987
　　　　　　　　　　　　　　　　　　　 382/177
5,995,659 A * 11/1999 Chakraborty ........ G06V 30/413
　　　　　　　　　　　　　　　　　　　 382/281

(Continued)

FOREIGN PATENT DOCUMENTS

CN　　 112966681 A　　 6/2021
JP　　 H05-174080 A　　 7/1993
(Continued)

OTHER PUBLICATIONS

International Search Report received in PCT Application No. PCT/JP2023/000063, dated Feb. 7, 2023.
(Continued)

*Primary Examiner* — Angelica Ruiz
(74) *Attorney, Agent, or Firm* — Rimon P.C.

(57) ABSTRACT

A drawing search server specifies an arrangement of plural boxes existing in a title field title field existing in target drawing data. The drawing search server executes character recognition processing on each character string existing at each position in the title field existing in the target drawing data. Based on the character recognition result and the arrangement of the plural boxes, the drawing search server specifies a target attribute value representing an attribute value of the target drawing data and specifies a target attribute which is an attribute associated in advance with the box. The drawing search server searches a drawing database for drawing data having an attribute value similar to the attribute value of the target drawing data based on a combination of the target attribute value and the target attribute, and outputs a search result.

14 Claims, 11 Drawing Sheets

(51) Int. Cl.
*G06F 16/58* (2019.01)
*G06F 16/583* (2019.01)

(56) References Cited

U.S. PATENT DOCUMENTS

| | | | |
|---|---|---|---|
| 2002/0126905 A1* | 9/2002 | Suzuki | G06V 30/2455 |
| | | | 382/229 |
| 2009/0204888 A1* | 8/2009 | Miyamoto | G06F 40/186 |
| | | | 715/243 |
| 2010/0268732 A1* | 10/2010 | Rohan | G06F 16/5838 |
| | | | 358/1.15 |
| 2010/0329577 A1* | 12/2010 | Kitai | G06T 11/60 |
| | | | 382/218 |
| 2013/0085746 A1* | 4/2013 | Itoh | G06V 10/98 |
| | | | 704/9 |
| 2013/0226963 A1* | 8/2013 | Poston | G06F 16/954 |
| | | | 707/769 |
| 2014/0289323 A1* | 9/2014 | Kutaragi | H04L 51/08 |
| | | | 709/206 |
| 2014/0365281 A1* | 12/2014 | Onischuk | G07C 13/00 |
| | | | 705/12 |
| 2015/0199324 A1* | 7/2015 | Nishioka | G06F 40/177 |
| | | | 715/212 |
| 2019/0318190 A1 | 10/2019 | Osada et al. | |
| 2021/0067640 A1* | 3/2021 | Kubo | G06F 16/532 |
| 2021/0224531 A1* | 7/2021 | Nakamura | G06V 30/413 |
| 2021/0232817 A1* | 7/2021 | Gao | H04W 84/12 |
| 2021/0409555 A1* | 12/2021 | Yoshihashi | G06F 3/04817 |
| 2022/0319219 A1* | 10/2022 | Tsibulevskiy | G06F 18/40 |

FOREIGN PATENT DOCUMENTS

| | | |
|---|---|---|
| JP | H08-161373 A | 6/1996 |
| JP | 2000-194712 A | 7/2000 |
| JP | 2001-282810 A | 10/2001 |
| JP | 2003-296377 A | 10/2003 |
| JP | 2014-92836 A | 5/2014 |
| JP | 2014-182477 A | 9/2014 |
| JP | 2016-071898 A | 5/2016 |

OTHER PUBLICATIONS

Decision to Grant a Patent received in Japanese Patent Application No. 2022-000659, dated Sep. 26, 2023.
Extended European Search Report issued in the corresponding European Patent Application No. 23737292.5 on Aug. 22, 2025.

* cited by examiner

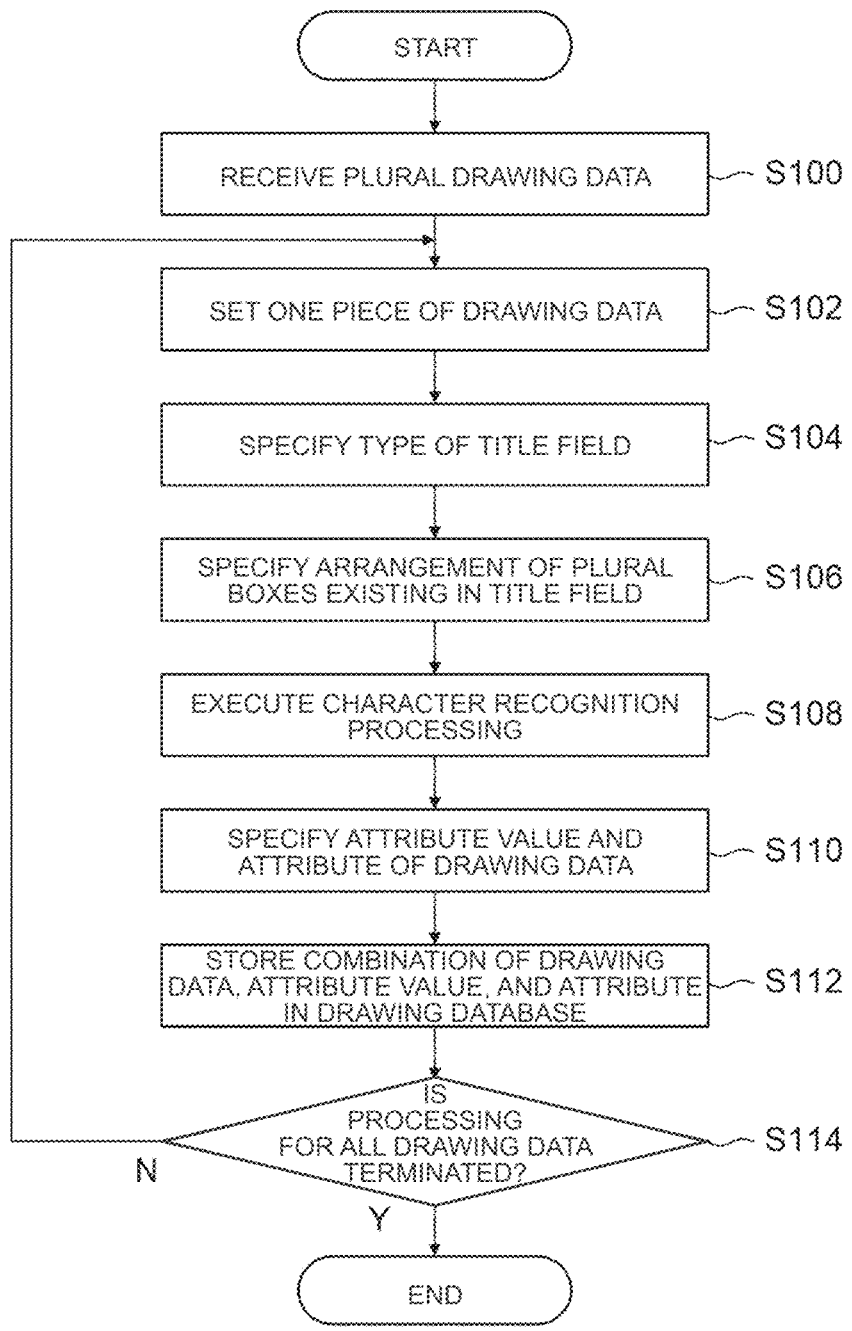

FIG.5

| SCALE | REMARKS | | DRAFTING | MAP INSPECTION | DRAWING ISSUED |
|---|---|---|---|---|---|
| 1:4 | | | KATO | KOBASHI | 4/3/2020 |
| SERIAL NUMBER | FIGURE NUMBER | COMPONENT NAME | SIZE | MATERIAL | SURFACE TREATMENT |
| 35000 | KT-U65 | SHIFTING GUIDE | ... | SUS304 | TRIVALENT CHROMATE |
| CUSTOMER | KATO INDUSTRIAL CO., LTD. | | | DEADLINE | 12/15/2020 |

— TA

| FIGURE NUMBER | ITEM NAME | DRAFTING | MAP INSPECTION |
|---|---|---|---|
| KT-U65 | SHIFTING GUIDE | KATO | KOBASHI |
| SCALE | SURFACE TREATMENT | MATERIAL | |
| 1:4 | TRIVALENT CHROMATE | SUS304 | |

| TITLE FIELD ID | COMPANY NAME | STRUCTURE INFORMATION OF RULED LINE CONFIGURING TITLE FIELD | BOX ATTRIBUTE ASSOCIATION INFORMATION |
|---|---|---|---|
| 00001 | KATO INDUSTRIAL CO., LTD. | ... | ... |
| 00002 | ... | ... | ... |
| ... | ... | ... | ... |

FIG.8A

| FIGURE NUMBER | ITEM NAME | DRAFT-ING | MAP IN-SPECTION |
|---|---|---|---|
| KT-U65 | SHIFTING GUIDE | KATO | KOBASHI |
| SCALE | SURFACE TREATMENT | MATERIAL ||
| 1:4 | TRIVALENT CHROMATE | SUS304 ||

| 1A | 2A | 3A | 4A |
|---|---|---|---|
| 1B | 2B | 3B | 4B |
| 5A | 6A | 7A ||
| 5B | 6B | 7B ||

FIG.8B

| 1A | 2A | 3A | 4A |
|---|---|---|---|
| 1B | 2B-1<br>2B-2 | 3B | 4B |
| 5A | 6A | 7A ||
| 5B | 6B | 7B ||

FIG.8C

|  |  | 3X | 4X |
|---|---|---|---|
| 1A | 2A | 3A | 4A |
| 1B | 2B-1<br>2B-2 | 3B | 4B |
| 5A | 6A | 7A ||
| 5B | 6B | 7B ||

| STANDARD TOLERANCE OF MACHINED PRODUCTS (JISB INTERMEDIATE) | | ... | ... | ... | ... |
|---|---|---|---|---|---|
| DIMENSION CLASSIFICATION | DIMEN-SION DIFFER-ENCE | ... | ... | ... | ... |
| 0.5 OR MORE AND 6 OR LESS | ±0.1 | | | | |
| 6 OR MORE AND 30 OR LESS | ±0.2 | ... | ... | ... | |
| 30 OR MORE AND 120 OR LESS | ±0.3 | | | | |
| 120 OR MORE AND 400 OR LESS | ±0.5 | | | | |
| 400 OR MORE AND 1000 OR LESS | ±0.8 | ... | ... | ... | |
| 1000 OR MORE AND 2000 OR LESS | ±1.2 | | | | |
| 2000 OR MORE AND 4000 OR LESS | ±2.0 | | | | |

| DRAWING ID | DRAWING DATA | ITEM NAME | MATERIAL | SURFACE TREATMENT | ... |
|---|---|---|---|---|---|
| 00001 | ... | SHIFTING GUIDE | SUS304 | TRIVALENT CHROMATE | ... |
| 00002 | ... | ... | ... | ... | ... |
| ... | ... | ... | ... | ... | ... |

FIG.12

| CORRECTION RULE ID | CORRECTION RULE |
|---|---|
| 00001 | WHEN "O (OH)" IS DETECTED IN BOX OF ATTRIBUTE VALUE CORRESPONDING TO ATTRIBUTE "DRAWING NUMBER", O IS REPLACED WITH "0 (ZERO)" |
| 00002 | ... |
| ... | ... |

R

| DICTIONARY DATA | |
|---|---|
| SOS304 | SUS304 |
| SuS304 | |
| ... | |
| ZAM IRON PLATE | ZAM STEEL PLATE |
| ... | |
| ... | |
| ... | ... |

D

DRAWING SEARCH DEVICE, DRAWING DATABASE CONSTRUCTION DEVICE, DRAWING SEARCH SYSTEM, DRAWING SEARCH METHOD, AND RECORDING MEDIUM

CROSS-REFERENCE TO RELATED APPLICATIONS

This application is a continuation of International Application No. PCT/JP2023/000063, filed on Jan. 5, 2023 which claims the benefit of priority of the prior Japanese Patent Application No. 2022-000659, filed on Jan. 5, 2022, the entire contents of which are incorporated herein by reference.

FIELD

The present invention relates to a drawing search device, a drawing database construction device, a drawing search system, a drawing search method, and a recording medium.

BACKGROUND

Conventionally, a drawing management server that enables full text search of a drawing only for a title area has been known (for example, Patent Document 1). The drawing management server acquires position coordinates of a title item including a predetermined character string among the character strings registered in a drawing search index at the time of registering the drawing, and determines the title area. Then, the drawing management server registers the position coordinates of the title item as title data, and acquires the position coordinates of the title area from the title data in response to a drawing search request from a user terminal. The drawing management server searches the drawing search index using search keywords included in the drawing search request, acquires the corresponding search keyword and the position coordinates thereof, and searches for a drawing including the search keyword in the title area using the search results.

In addition, there has been known a computer aided design device that enables automatic generation of a comprehensive version number list by electronically capturing title information from drawing data and creating a database, thereby achieving both securement of real-time properties and improvement of reliability (for example, Patent Document 2). The computer aided design device takes in at least each piece of information of a drawing name, a figure number, and a plate number displayed in a specific area on a screen. Then, the computer aided design device classifies and accumulates each information captured for each product. The computer aided design device reads information related to one product from the accumulated information and outputs the information to a screen or a hard copy in a predetermined format.

In addition, a drawing design system that automatically extracts attribute information from CAD drawing data and automatically registers the attribute information in a bill of materials has been known (for example, Patent Document 3). This drawing design system searches for a specific element of a CAD system existing in a CAD drawing of a component of a device, and extracts information of the component configured by the specific element from the CAD drawing as attribute information. The bill of materials system inspects consistency of attribute information with respect to the bill of materials. Then, when the attribute information has consistency, the attribute information is registered in the bill of materials.

In addition, there has been known a data processing device that simplifies pre-setup work including keyword extraction and registration and enables startup of a multi-document system in a short period of time (for example, Patent Document 4). The data processing device determines a file type from an extension of a file read from a document file, extracts a keyword from a range including a title field when the file type is a drawing, extracts a keyword from an item row and an item column of a form when the file type is the form, and extracts the keyword from a character string having a predetermined number of characters from a head of a document when the file type is a document.

In addition, there has been known a graphic processing method for creating attribute file management data of a character code by directly converting a plurality of management items described in a title field of a drawing for drawing management into a character code format from image data displayed on a display device (for example, Patent Document 5). In this graphic processing method, a drawing having a plurality of management items described in the title field of a screen input as image data is specified with a mouse device in a field of the management items at coordinates on a displayed drawing, and the image data described in the field is converted into characters to create file management data of an attribute of a character code.

Also, there has been known a system that provides an efficient and fast method of managing a digital form of a drafting drawing and that automatically identifies, indexes, and stores the drawing for easy and fast search without the need to manually enter the database (for example, Patent Document 6). The system analyzes data in digital form with a central processing unit according to a series of algorithms to identify each drafting drawing. When the system identifies a drawing, the information in each text box of a drawing frame is processed according to a series of predetermined algorithms to identify and classify the information in the text boxes. This information is collated in the database according to specified criteria and its classification, allowing a user to discover and search specific drawings.

As disclosed in Patent Documents 1 to 6, a title field is often provided in the drawing data. In this title field, an attribute value representing an attribute of the drawing often exists. For example, there is a case where there is a notation of "bakelite" which is an attribute value representing the attribute of "material" in the title field in the drawing data.

However, there are various title fields of the drawing data, and it may not be possible to accurately specify an attribute and an attribute value corresponding to the attribute. In general, a structure and description information of the title field vary depending on a creator of the drawing, and there is no unified standard in the industry. Thus, there are a wide variety of title fields in the drawings.

In the technique disclosed in Patent Documents 1 to 6, various types of title fields are not considered.

For example, paragraph [0011] of Patent Document 6 discloses that "The contents of the box are further analyzed to check whether the box contains contents of two different models, such as a title of the box and a description of the contents; and upon finding such a box and determining that the box is a suitable drawing box, the contents of the box are classified and stored in a structured database to make the drawing searchable.". However, since there are various types of drawing boxes in the title field, it is difficult to specify "contents of two different types such as the title and the description of the contents of the box" for all the boxes by the technology of Patent Document 6.

In consideration of the above fact, an object of the present invention is to accurately specify a combination of an attribute and an attribute value of target drawing data and to accurately search for drawing data similar to target drawing data, as compared with a case where a type of a title field of the target drawing data is not specified.

SUMMARY

A similar drawing search device according to an embodiment comprises a title field specification unit that specifies a type of a title field existing in target drawing data; an arrangement specification unit that specifies arrangement of a plurality of boxes existing in the title field on a basis of the type of the title field specified by the title field specification unit; a recognition unit that executes character recognition processing on each of character strings existing at respective positions in a title field existing in the target drawing data; an attribute specification unit that specifies a target attribute value representing an attribute value of the target drawing data represented by a character string in the box on a basis of a character recognition result by the recognition unit and the arrangement of the plurality of boxes specified by the arrangement specification unit, and specifies a target attribute that is an attribute associated with the box in advance; and a search unit that searches, on a basis of the combination of the target attribute value and the target attribute specified by the attribute specification unit, drawing data having an attribute value similar to an attribute value of the target drawing data from a database in which the drawing data, the attribute value of the drawing data, and the attribute corresponding to the attribute value are associated with each other, and outputs a search result.

A drawing database construction device according to an embodiment comprises a construction title field specification unit that specifies a type of a title field existing in drawing data for database construction; a construction arrangement specification unit that specifies arrangement of a plurality of boxes existing in the title field on a basis of the type of the title field specified by the construction title field specification unit; a construction recognition unit that executes a character recognition process on each character string existing at each position in a title field existing in the drawing data; a construction attribute specification unit that specifies an attribute value of the drawing data represented by a character string in the box and specifies an attribute associated with the box in advance on a basis of a character recognition result by the construction recognition unit and the arrangement of the plurality of boxes specified by the construction arrangement specification unit; and a construction unit that constructs a database by storing a combination of the attribute value specified by the construction attribute specification unit, the attribute, and the drawing data in the database.

BRIEF DESCRIPTION OF THE DRAWINGS

FIG. 4 is a diagram illustrating a drawing database construction process executed by the drawing search system according to the present embodiment;

FIG. 5 is a diagram illustrating a structure of a title field;

FIG. 6 is a diagram illustrating an example of data stored in a title field database;

FIG. 8A is a diagram illustrating an example of box attribute association information;

FIG. 8B is a diagram illustrating an example of the box attribute association information;

FIG. 8C is a diagram illustrating an example of the box attribute association information;

FIG. 8D is a diagram illustrating an example of information that is not stored in the drawing database;

FIG. 12 is a diagram illustrating an example of a correction rule and dictionary data.

DETAILED DESCRIPTION

Hereinafter, embodiments will be described in detail with reference to the drawings.

<System Configuration of Drawing Search System>

Figure 1:
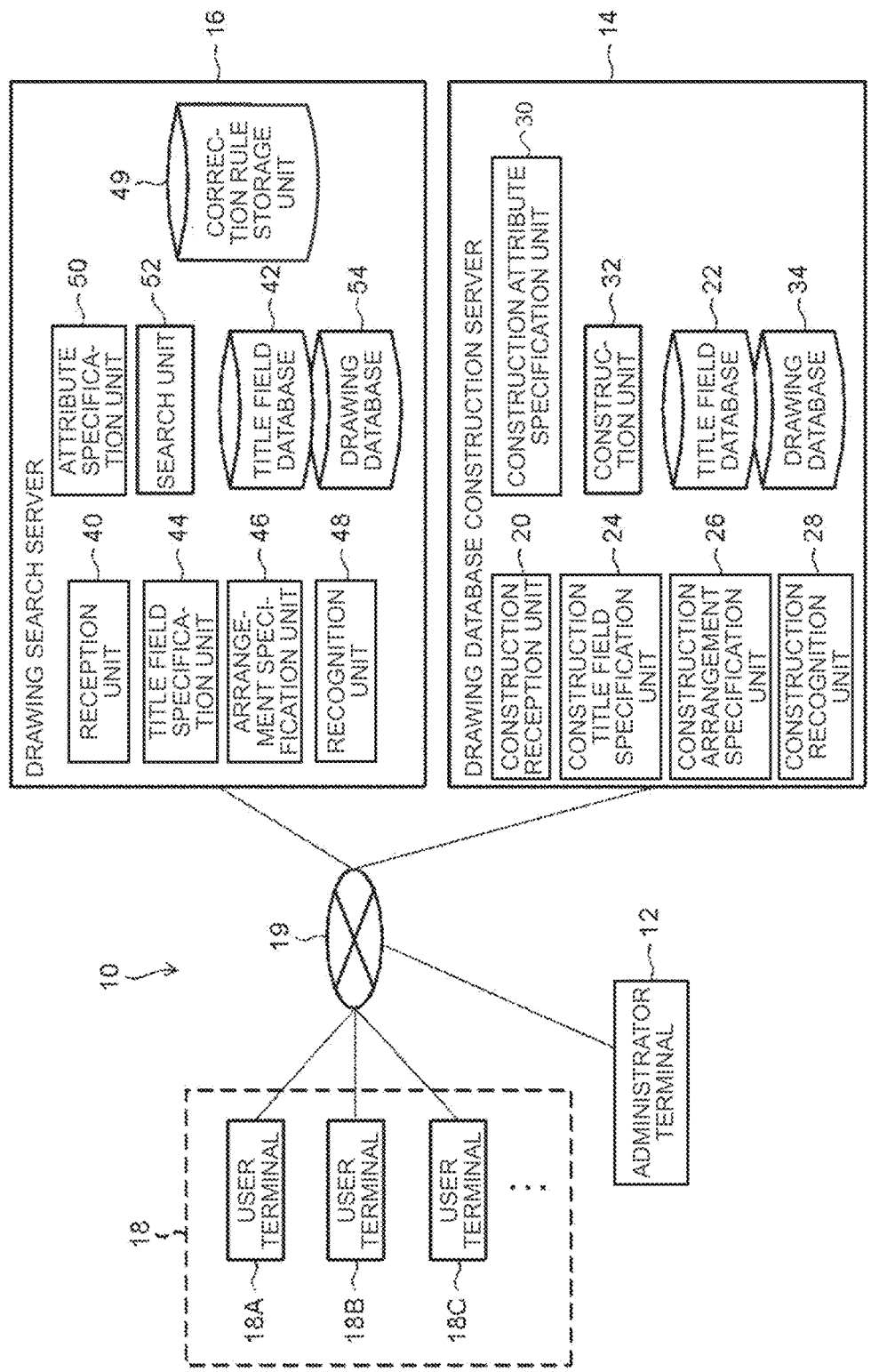
FIG. 1 is a diagram illustrating an example of a schematic configuration of a drawing search system according to the present embodiment.

FIG. 1 is a block diagram illustrating a drawing search system 10 according to the present embodiment. As illustrated in FIG. 1, a drawing search system 10 according to the present embodiment includes an administrator terminal 12, a drawing database construction server 14, a drawing search server 16, and a plurality of user terminals 18A, 18B, and 18C. Note that, hereinafter, one user terminal is referred to as a user terminal 18 except when a specific terminal is indicated. The administrator terminal 12, the drawing database construction server 14, the drawing search server 16, and the user terminal 18 are communicably connected by a network 19 such as the Internet.

The drawing search system 10 of the present embodiment specifies an attribute value of drawing data represented by a character string in a box existing in a title field based on the type of the title field existing in the drawing data, and searches for the drawing data having an attribute value similar to the specified attribute value.

Figure 2:
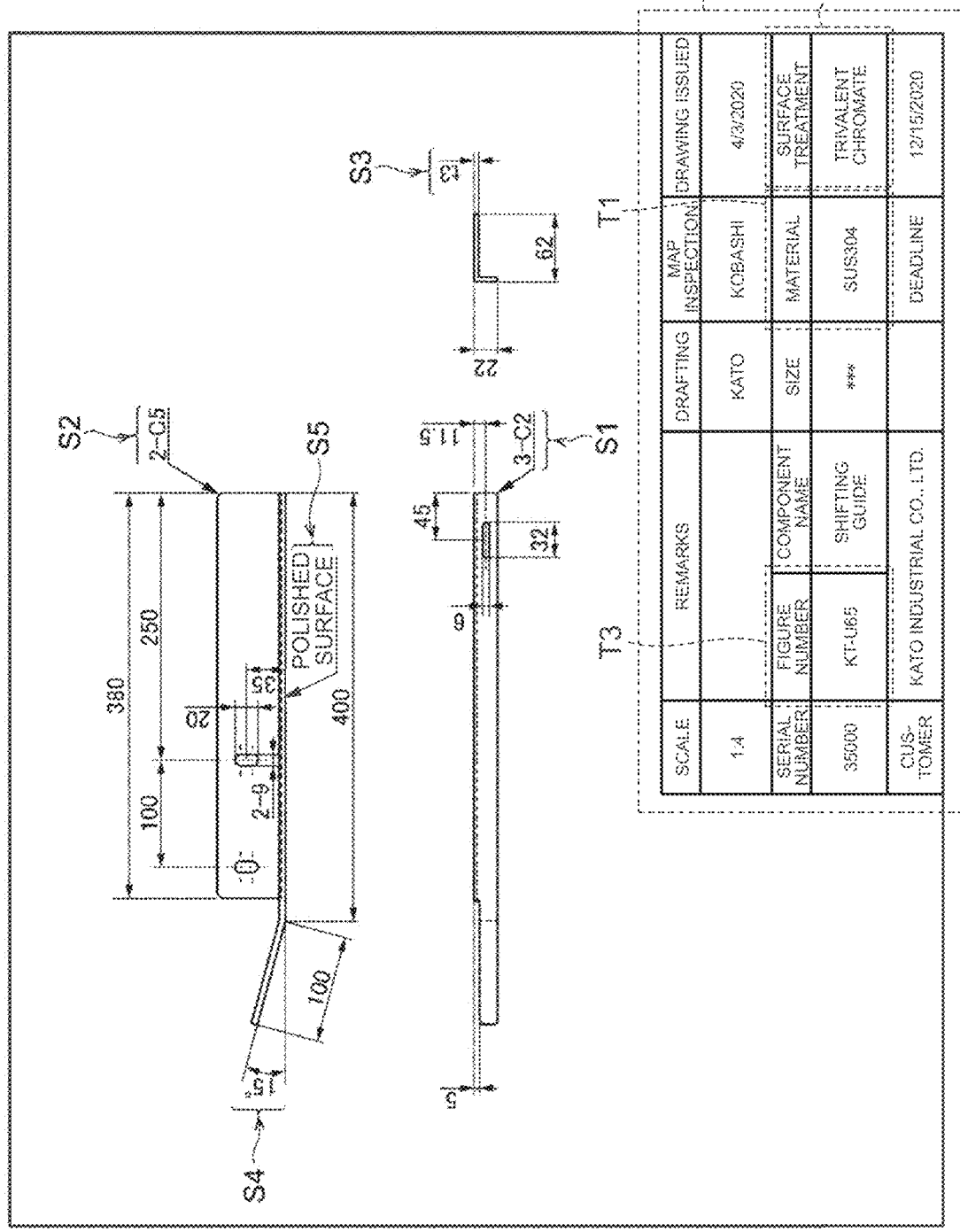
FIG. 2 is a diagram illustrating an example of drawing data.

FIG. 2 illustrates an example of the drawing data. Note that the drawing data targeted by the present embodiment is, for example, data in a portable document format (PDF) generated by scanning a paper drawing. The drawing data of FIG. 2 illustrates a metal processed product. Various information is described in a title field T of the drawing data of FIG. 2. For example, in the example illustrated in FIG. 2, information T1 indicating a material of a component to be subjected to metal processing, information T2 regarding a surface specification of a metal processed product, a drawing number T3, and the like are described. These pieces of information are useful information for searching the drawing data.

Therefore, the drawing search system 10 of the present embodiment specifies the type of the title field existing in the drawing data, specifies an attribute value of the drawing data existing in the title field based on the type of the title field, and searches for the drawing data having an attribute value similar to the specified attribute value. As a result, drawing data similar to certain drawing data can be searched with high accuracy.

Hereinafter, a specific description will be given.

(Administrator Terminal 12)

The administrator terminal 12 is a terminal operated by a management user who manages the drawing search server 16 and the drawing database construction server 14. Specifically, the management user exchanges information with the drawing search server 16 and the drawing database construction server 14 by operating the administrator terminal 12.

(Drawing Database Construction Server 14)

The drawing database construction server 14 is a server for constructing a database storing a plurality of pieces of drawing data. As illustrated in FIG. 1, the drawing database construction server 14 includes a construction reception unit 20, a title field database 22, a construction title field specification unit 24, a construction arrangement specification unit 26, a construction recognition unit 28, a construction attribute specification unit 30, a construction unit 32, a title field database 22, and a drawing database 34.

The title field database 22 stores data of a plurality of types of title fields. The title field database 22 functions as a title field library. Details of the title field database 22 will be described later.

The drawing database 34 stores drawing data, attributes of the drawing data, and attribute values of the drawing data in association with each other. Details of the drawing database 34 will be described later.

(Drawing Search Server 16)

The drawing search server 16 is a server for searching for drawing data similar to target drawing data from a database storing a plurality of pieces of drawing data. As illustrated in FIG. 1, a reception unit 40, a title field database 42, a title field specification unit 44, an arrangement specification unit 46, a recognition unit 48, a correction rule storage unit 49, an attribute specification unit 50, a search unit 52, and a drawing database 54 are provided.

Data similar to that in the title field database 22 is stored in the title field database 42. The drawing database 54 stores data similar to that of the drawing database 34.

(User Terminal 18)

The user terminal 18 is a terminal operated by a user. Specifically, the user exchanges information with the drawing search server 16 by operating the user terminal 18.

Figure 3:
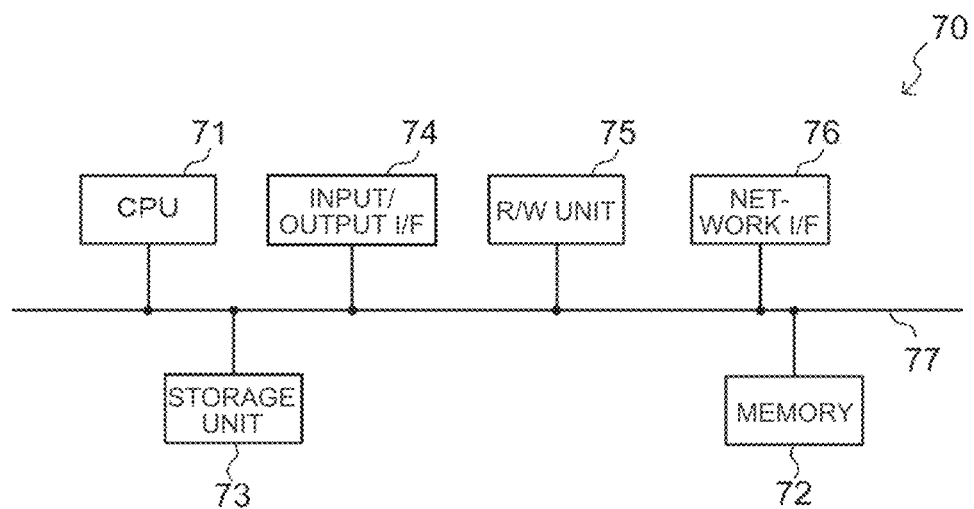
FIG. 3 is a schematic block diagram of a computer that functions as each device of a drawing search system.

Each of the administrator terminal 12, the drawing database construction server 14, the drawing search server 16, and the user terminal 18 of the drawing search system 10 can be realized by, for example, a computer 70 illustrated in FIG. 3. The computer 70 includes a CPU 71, a memory 72 as a temporary storage area, and a nonvolatile storage unit 73. In addition, the computer 70 includes an input/output interface (I/F) 74 to which an input/output device or the like (not illustrated) is connected, and a read/write (R/W) unit 75 that controls reading and writing of data with respect to a recording medium. In addition, the computer 70 includes a network I/F 76 connected to a network such as the Internet. The CPU 71, the memory 72, the storage unit 73, the input/output I/F 74, the R/W unit 75, and the network I/F 76 are connected to each other via a bus 77.

The storage unit 73 can be realized by a hard disk drive (HDD), a solid state drive (SSD), a flash memory, or the like. The storage unit 73 as a recording medium stores a program for causing the computer 70 to function. The CPU 71 reads the program from the storage unit 73, develops the program in the memory 72, and sequentially executes processes included in the program. Here, the CPU 71 according to the embodiment is an example of at least one processing circuitry that reads a program from the storage unit 73, expands the program in the memory 72, and sequentially executes processes included in the program. The at least one processing circuitry is not limited to the CPU 71, and an arbitrary processor may be used. In the drawing database construction server 14, the at least one processing circuitry executes the program read from the storage unit 73 and loaded to the memory 72, thereby implementing functions as the construction reception unit 20, the title field database 22, the construction title field specification unit 24, the construction arrangement specification unit 26, the construction recognition unit 28, the construction attribute specification unit 30, the construction unit 32, the title field database 22, and the drawing database 34. In the drawing search server 16, the at least one processing circuitry implements functions as the reception unit 40, the title field database 42, the title field specification unit 44, the arrangement specification unit 46, the recognition unit 48, the correction rule storage unit 49, the attribute specification unit 50, the search unit 52, and the drawing database 54 by executing the program read from the storage unit 73 and loaded into the memory 72.

<Operation of Drawing Search System 10>

Next, an operation of the drawing search system 10 according to the present embodiment will be described. First, a scene where the management user operates the administrator terminal 12 to construct a database storing a plurality of pieces of drawing data will be described.

The management user operates the administrator terminal 12 to input a plurality of pieces of drawing data for database construction to the drawing database construction server 14. Then, the drawing database construction server 14 executes a processing routine illustrated in FIG. 4.

In Step S100, the construction reception unit 20 receives a plurality of pieces of drawing data for database construction.

In Step S102, the construction title field specification unit 24 sets one piece of drawing data among the plurality of pieces of drawing data received in Step S100.

In Step S104, the construction title field specification unit 24 specifies the type of the title field existing in the drawing data set in Step S102.

FIG. 5 illustrates an example of the title field. A structure of a title field $T_A$ and a structure of a title field $T_B$ illustrated in FIG. 5 are different. Here, in order to extract useful information from the title field of the drawing data, it is necessary to specify the type of the title field and to specify what information is stored in each of the plurality of boxes existing in the title field of the type.

Therefore, the drawing database construction server 14 of the present embodiment specifies the type of the title field using the title field database 22 storing the information regarding the plurality of types of title fields, specifies what information is stored in each box of the type of title field, and then acquires the information of the character string stored in each box of the title field.

The title field database 22 stores, for example, a table as illustrated in FIG. 6. In the example illustrated in FIG. 6, a title field ID, a company name, structure information of a ruled line configuring the title field used by the company, and box attribute association information indicating what attribute and attribute value are stored in each box of the title field are associated with each other.

Figure 7:
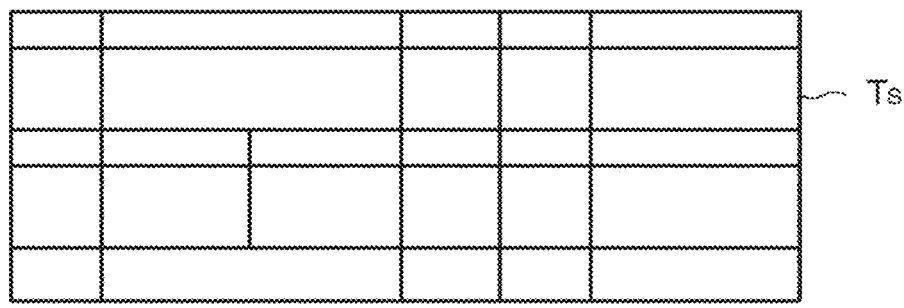
FIG. 7 is a diagram illustrating an example of structure information of a ruled line configuring a title field.

The structure information of the ruled line configuring the title field is, for example, data representing a structure $T_S$ of the title field as illustrated in FIG. 7. Furthermore, the box attribute association information indicating what attribute and attribute value are stored in each box of the title field is, for example, information as illustrated in FIG. 8A to 8C. As illustrated in FIGS. 8A to 8C, in the box attribute association information, what attribute and attribute value are stored in each box of the title field is specified in advance. For example, the box attribute association information is information in which the attribute of the drawing number is stored in a box 1A of the title field and the attribute value of the actual drawing number is stored in a box 1B. Note that a relative positional relationship between the structure information of the ruled line and the box attribute association information indicating what attribute and attribute value are stored in each box of the title field may be associated in advance. Therefore, for example, as illustrated in FIG. 8B, the box attribute association information may be information in which the attribute of an item name is stored in the box 2A of the title field and two attribute values of 2B-1 and 2B-2 are stored as the attribute values of the item name in the box below 2A of the title field. In this case, for example, the attribute value of a model name may be stored in a portion of 2B-1, and the attribute value of a variation type of the model name may be stored in a portion of 2B-2. Further, for example, when a plurality of parts is drawn in one drawing, the title field may be expanded. In this case, for example, as illustrated in FIG. 8C, the box attribute association information is information in which an attribute value of a certain part name drawn in the drawing is described in a portion 3X located above a box 3A in the title field, and an attribute value of another part name drawn in the drawing is described in a portion 4X located above 4A in the title field. Note that, as illustrated in FIG. 8C, in the present embodiment, an area in which the text is read can be set without being bound to the inside of the title field. Therefore, for example, it is also possible to read a text existing in an area outside the title field in which a relative positional relationship with the title field is a predetermined relationship.

Therefore, in Step S104, the construction title field specification unit 24 specifies which type of the title field of the drawing data set in Step S102 corresponds to among the plurality of types of title fields stored in the title field database 22.

For example, the construction title field specification unit 24 calculates the degree of match between the ruled lines by superimposing the ruled line of the title field of the drawing data set in Step S102 and the ruled line for each of the plurality of types of title fields stored in the title field database 22. Then, the construction title field specification unit 24 specifies that the type of the title field of the drawing data set in Step S102 is the type of the title field having the highest matching degree on the basis of the calculation result of the matching degree.

In Step S106, the construction arrangement specification unit 26 specifies the arrangement of a plurality of boxes existing in the title field on the basis of the type of the title field specified in Step S104.

In Step S108, the construction recognition unit 28 executes character recognition processing on each character string existing at each position in the title field existing in the drawing data set in Step S102. For example, the construction recognition unit 28 executes character recognition processing using a known optical character reader (OCR).

In Step S110, the construction attribute specification unit 30 specifies the attribute value of the drawing data represented by the character string in the box and specifies the attribute associated with the box in advance on the basis of the character recognition result obtained in Step S108 and the arrangement of the plurality of boxes specified in Step S106.

As described above, the box attribute association information is stored in the table as illustrated in FIG. 6. Therefore, in Step S110, the construction attribute specification unit 30 refers to the box attribute association information of the table as illustrated in FIG. 6, and specifies the attribute value and the attribute of the drawing data set in Step S102. For example, the construction attribute specification unit 30 refers to the information as illustrated in FIG. 6 and specifies the attribute "item name" of the title field of the drawing data set in Step S102 and the attribute value "adjustment guide" thereof.

In Step S112, the construction attribute specification unit 30 stores the combination of the drawing data set in Step S102 and the attribute value specified in Step S110 in the drawing database 34. For example, the information stored in a field V of a general tolerance as illustrated in FIG. 8D is not stored in the drawing database 34. This is because the information stored in the field V of the general tolerance is added to any title field, and thus, there is a high possibility that it is not useful for searching the later-described drawing data.

Figures 9, 10:
FIG. 9 is a diagram illustrating an example of data stored in a drawing database.
FIG. 10 is a diagram illustrating an example of a screen displayed on the user terminal.

The drawing database 34 stores, for example, a table as illustrated in FIG. 9. In the example illustrated in FIG. 9, a drawing ID, drawing data, and an attribute thereof are associated with each other. For example, the attribute "item name" is stored in association with the "shifting guide" which is the attribute value. A table for associating the actually recognized character string "component name" with the attribute "item name" may be separately prepared in advance.

In Step S114, the construction attribute specification unit 30 determines whether or not the processing in Steps S102 to S112 has been executed for all the drawing data received in Step S100. When the processing of Steps S102 to S112 is executed for all the drawing data received in Step S100, the present processing routine is terminated. On the other hand, in a case where there is drawing data for which the processing in Steps S102 to S112 has not been executed, the process returns to Step S102.

With execution of the database construction processing routine of FIG. 4, the combination of the attribute and the attribute value for each of the plurality of pieces of drawing data is stored in the drawing database 34.

The data stored in the drawing database 34 of the drawing database construction server 14 is also stored in the drawing database 54 of the drawing search server 16. The data stored in the title field database 22 of the drawing database construction server 14 is also stored in the title field database 42 of the drawing search server 16.

Next, a scene where a user operates his or her user terminal 18 to search for drawing data similar to the target drawing data will be described.

Figure 11:
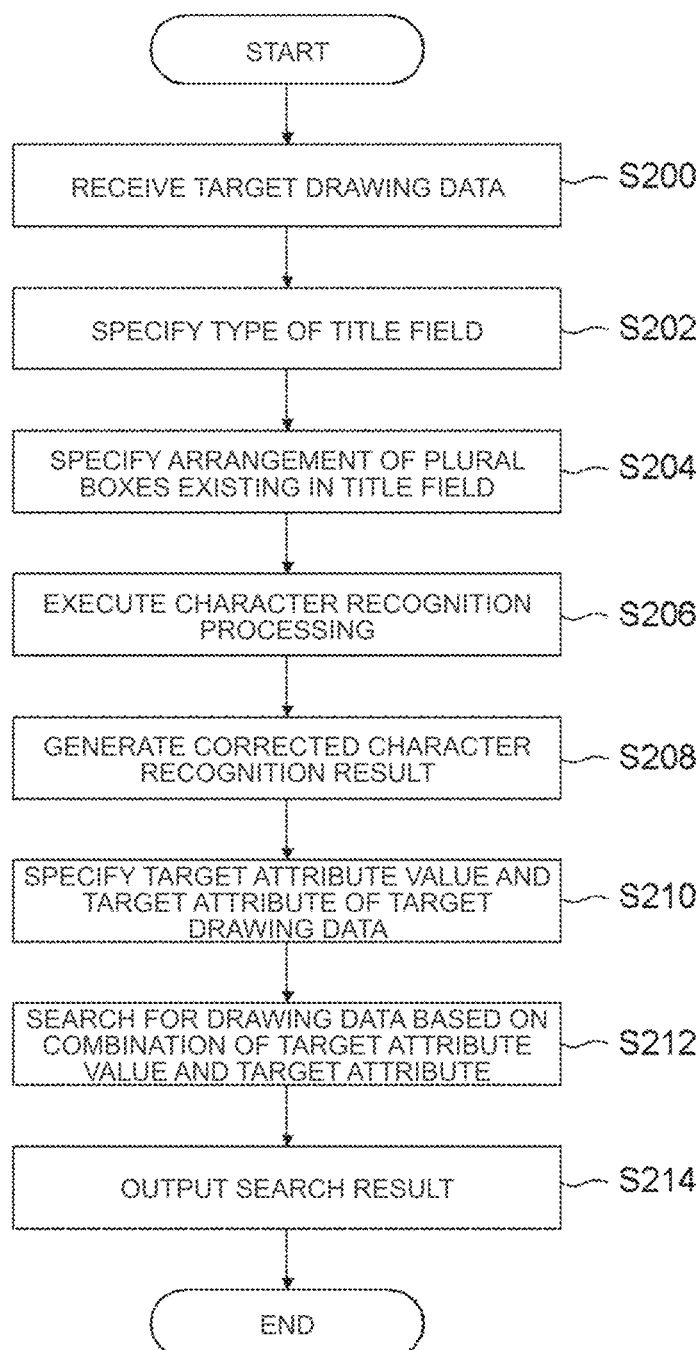
FIG. 11 is a diagram illustrating processing executed by the drawing search system according to the present embodiment.

The user operates his/her own user terminal 18 to input the target drawing data to the drawing search server 16. For example, a screen as illustrated in FIG. 10 is displayed on a display (not illustrated) of the user terminal 18, and when target drawing data is dragged and dropped according to a user's operation, the user terminal 18 transmits instruction data indicating that the target drawing data is selected to the drawing search server 16. In response to the reception of the target drawing data, the drawing search server 16 executes a drawing search routine illustrated in FIG. 11.

In Step S200, the reception unit 40 receives the target drawing data.

In Step S202, the title field specification unit 44 refers to the data stored in the title field database 42 and specifies the type of the title field existing in the target drawing data received in Step S200. Specifically, the title field specification unit 44 specifies the type of the title field existing in the target drawing data by the same method as the construction title field specification unit 24.

In Step S204, the arrangement specification unit 46 refers to the data stored in the title field database 42 and specifies the arrangement of the plurality of boxes existing in the title field on the basis of the type of the title field specified in Step S202. Specifically, the arrangement specification unit 46 specifies the arrangement of a plurality of boxes existing in the title field by a method similar to that of the construction arrangement specification unit 26.

In Step S206, the recognition unit 48 executes character recognition processing on each character string existing at each position in the title field existing in the target drawing data.

In Step S208, the attribute specification unit 50 corrects a character recognition result obtained in Step S206 on the basis of the correction rule or the dictionary data stored in the correction rule storage unit 49, thereby generating a corrected character recognition result in which the character recognition result is corrected.

FIG. 12 illustrates an example of the correction rule and the dictionary data stored in the correction rule storage unit 49. As illustrated in FIG. 12, a plurality of correction rules R are stored in the correction rule storage unit 49.

For example, different correction rules are set in advance for each of a plurality of boxes existing in the title field. For example, a correction rule such as "when "O (oh)" is detected in the box of the attribute value corresponding to the attribute "drawing number", O is replaced with "0 (zero)"." is preset in the character recognition result. Note that this correction rule may be set in advance for each user. For example, since an alphabet does not appear in a field of a "drawing number" of a title field used by a certain company, a correction rule of replacing with "0 (zero)" in a case where "O (oh)" is detected is set.

Further, as illustrated in FIG. 12, dictionary data D is data in which a character string indicating an erroneous character recognition result and a correct character string indicating an attribute value of the drawing data are associated with each other. For example, as illustrated in FIG. 12, a correct character string "SUS 304" representing an attribute value of the drawing data is associated with an incorrect character recognition result such as "SOS 304" or "SuS 304".

Therefore, for each of the plurality of boxes of the title field, the attribute specification unit 50 corrects the character recognition result on the basis of a correction rule set in advance for the box with respect to the character recognition result of the character string existing in the box.

In addition, the attribute specification unit 50 corrects the character recognition result on the basis of dictionary data in which a character string representing an erroneous character recognition result and a correct character string representing an attribute value of the drawing data are associated with each other as a correction rule, thereby generating a corrected character recognition result in which the character recognition result is corrected.

In Step S210, based on the corrected character recognition result obtained in Step S208 and the arrangement of the plurality of boxes specified in Step S204, the attribute specification unit 50 specifies the target attribute value representing the attribute value of the target drawing data represented by the character string in the box, and specifies the target attribute which is the attribute associated with the box in advance. Specifically, the attribute specification unit 50 specifies the target attribute value and the target attribute by a method similar to that of the construction attribute specification unit 30.

In Step S212, the search unit 52 searches the drawing data having an attribute value similar to the attribute value of the target drawing data from the drawing database 34 based on the combination of the target attribute value and the target attribute specified in Step S210.

In Step S214, the search unit 52 outputs the search result of the drawing data having the attribute value similar to the attribute value of the target drawing data, whereby the present processing routine is terminated.

Note that the search result output from the search unit 52 is transmitted to the user terminal 18. The user checks the search result displayed on the display unit (not illustrated) of the user terminal 18 of the user.

As described above, the drawing search server according to the present embodiment specifies the type of the title field existing in the target drawing data, and specifies the arrangement of the plurality of boxes existing in the title field on the basis of the specified type of the title field. Then, the drawing search server executes character recognition processing on each character string existing at each position in the title field existing in the target drawing data. The drawing search server specifies the target attribute value representing the attribute value of the target drawing data represented by the character string in the box and specifies the target attribute which is the attribute associated with the box in advance based on the character recognition result and the arrangement of the plurality of specified boxes. The drawing search server searches for drawing data having an attribute value similar to the attribute value of the target drawing data from a drawing database in which the drawing data, the attribute value of the drawing data, and the attribute corresponding to the attribute value are associated with each other based on the specified combination of the target attribute value and the target attribute, and outputs a search result. As a result, as compared with a case where the type of the title field is not specified, the combination of the attribute and the attribute value of the target drawing data can be specified with high accuracy, and the drawing data similar to the target drawing data can be searched with high accuracy.

Further, the drawing search server according to the present embodiment corrects the character recognition result based on a preset correction rule to specify the target attribute value of the target drawing data. For example, the correction rule is preset for each user. Furthermore, for example, different correction rules are set in advance for each of a plurality of boxes existing in the title field, and the drawing search server corrects the character recognition result on the basis of the correction rule set in advance for each of the plurality of boxes. Furthermore, for example, the drawing search server corrects the character recognition result on the basis of dictionary data in which a character string representing an erroneous character recognition result and a correct character string representing an attribute value of the drawing data are associated with each other as a correction rule. As a result, since the character recognition result by OCR is corrected, the attribute value of the target drawing data can be accurately specified. As a result, drawing data similar to the target drawing data can be searched with high accuracy. In addition, target drawing data can be searched based on a plurality of attribute values given to the drawing data.

In addition, the drawing database construction server according to the present embodiment specifies the type of the title field existing in the drawing data for database construction, and specifies the arrangement of the plurality of boxes existing in the title field based on the specified type of the title field. The drawing database construction server executes character recognition processing on each character string existing at each position in the title field existing in the drawing data. Then, the drawing database construction server constructs a database by specifying an attribute value of the drawing data represented by the character string in the box based on the character recognition result and the arrangement of the plurality of specified boxes, specifying an attribute associated with the box in advance, and storing a combination of the specified attribute value, attribute, and drawing data in the drawing database. As a result, it is possible to automatically construct a database for accurately searching for drawing data similar to the target drawing data.

Note that the present invention is not limited to the above-described embodiments, and various modifications and applications can be made without departing from the spirit of the present invention.

For example, in the above embodiment, the case where the drawing database construction server 14 specifies the attribute value and the attribute without generating the corrected character recognition result as in the drawing search server 16 has been described as an example, but the present invention is not limited thereto. Similarly to the drawing search server 16, the drawing database construction server 14 may also generate a corrected character recognition result using a correction rule and dictionary data to specify an attribute value and an attribute.

Furthermore, in the above embodiment, the case where the character recognition processing is executed for each box of the title field has been described as an example, but the present invention is not limited thereto. For example, the construction recognition unit 28 of the drawing database construction server 14 and the recognition unit 48 of the drawing search server 16 may further execute character recognition processing on each of the character strings existing in a portion different from the inside of the title field, and may specify the attribute value or the target attribute value on the basis of the character recognition result of the character string existing in the portion different from the inside of the title field. In the example illustrated in FIG. 2, attribute values S1, S2, S3, and S4 of the drawing data are also described in portions different from the title field T. Therefore, the construction recognition unit 28 of the drawing database construction server 14 and the recognition unit 48 of the drawing search server 16 may specify the attribute value and the attribute by executing the character recognition processing on the character string existing at a position different from the title field T. In this case, a correction rule and dictionary data may be used.

Furthermore, in a case where the attribute value or the target attribute value is not specified on the basis of the character recognition result in the title field, the construction recognition unit 28 of the drawing database construction server 14 and the recognition unit 48 of the drawing search server 16 may execute the character recognition processing on each of the character strings existing at a position different from the position in the title field of the drawing data or the target drawing data, and the construction attribute specification unit 30 or the attribute specification unit 50 may specify the attribute value or the target attribute value and the attribute on the basis of the character recognition result of the character string existing at a position different from the position in the title field. In this case, a correction rule and dictionary data may be used.

Furthermore, in the above-described embodiment, the case where the type of the title field is specified on the basis of the degree of match between the ruled lines of various title fields stored in the title field database 22 and the ruled line of the title field of the drawing data or the target drawing data has been described as an example, but the present invention is not limited thereto. For example, the type of the title field may be specified on the basis of a character string (for example, a company name existing in a lower column of a column of the company name) at a specific portion in the title field.

In addition, a process of deleting a character considered to be noise from the character recognition result may be added to the correction rule. For example, in a case where characters or symbols that are noise, such as "." and "|", are included in the character recognition result, they may be removed.

Furthermore, in the present specification, the embodiment in which the program is installed in advance has been described, but the program can be provided by being stored in a computer-readable recording medium.

In the above embodiment, the case where the computer on the server side or the client side is realized by one computer has been exemplified. On the other hand, software may be installed in a plurality of computers, and each of the plurality of computers may include all or some of the components according to the embodiment. In this case, a form of distributed computing in which computers execute communication processing with each other may be applied. Furthermore, the information transmitted from the client side computer may be processed by one or a plurality of computers as a server side provided on a cloud. The server-side or client-side computer described in the embodiment includes one component, but may include a plurality of the same components.

Furthermore, various operations executed by the computer in the present embodiment can also be executed in parallel processing using at least one processor or using a plurality of computers through a network. In addition, various operations may be distributed to a plurality of arithmetic cores in the processor and executed in parallel processing. Furthermore, various operations executed by the computer on the server side may be executed by at least one processor and at least one storage device provided on a cloud communicable with the computer on the client side through a network.

(Supplement)

The following technique is disclosed by the above description of the embodiments.

(1)

A drawing search device including:

a title field specification unit that specifies a type of a title field existing in target drawing data;

an arrangement specification unit that specifies arrangement of a plurality of boxes existing in the title field on a basis of the type of the title field specified by the title field specification unit;

a recognition unit that executes character recognition processing on each of character strings existing at respective positions in a title field existing in the target drawing data;

an attribute specification unit that specifies a target attribute value representing an attribute value of the target drawing data represented by a character string in the box on a basis of a character recognition result by the (1)
recognition unit and the arrangement of the plurality of boxes specified by the arrangement specification unit, and specifies a target attribute that is an attribute associated with the box in advance; and a search unit that searches, on a basis of the combination of the target attribute value and the target attribute specified by the attribute specification unit, drawing data having an attribute value similar to an attribute value of the target drawing data from a database in which the drawing data, the attribute value of the drawing data, and the attribute corresponding to the attribute value are associated with each other, and outputs a search result.

(2)
The drawing search device according to (1), in which the attribute specification unit corrects a character recognition result by the recognition unit on a basis of a preset correction rule to generate a corrected character recognition result in which the character recognition result is corrected, and specifies the target attribute value on a basis of the corrected character recognition result.

(3)
The figure search device according to (2), in which the correction rule is preset for each user.

(4)
The figure search device according to (2) or (3), in which the different correction rule is preset for each of a plurality of boxes existing in the title field, and the attribute specification unit corrects the character recognition result by the recognition unit on a basis of the correction rule set in advance for the box with respect to the character recognition result of the character string existing in the box for each of the plurality of boxes.

(5)
The drawing search device according to any one of (2) to (4), in which the attribute specification unit corrects the character recognition result by the recognition unit on a basis of dictionary data in which a character string representing an erroneous character recognition result and a correct character string representing an attribute value of the drawing data are associated as the correction rule to generate a corrected character recognition result in which the character recognition result is corrected.

(6)
The drawing search device according to any one of (1) to (5), in which the recognition unit further executes a character recognition process on each of character strings existing at a position different from the position in the title field of the target drawing data, and specifies the target attribute value on a basis of a character recognition result of a character string existing at a position different from that in the title field.

(7)
The drawing search device according to any one of (1) to (6), in which when the target attribute value is not specified on the basis of the character recognition result in the title field, the recognition unit executes character recognition processing on each of character strings existing at positions different from those in the title field of the target drawing data, and the attribute specification unit specifies the target attribute value on a basis of a character recognition result of a character string existing at a position different from that in the title field.

(8)
A drawing database construction device including:

a construction title field specification unit that specifies a type of a title field existing in drawing data for database construction;

a construction arrangement specification unit that specifies arrangement of a plurality of boxes existing in the title field on a basis of the type of the title field specified by the construction title field specification unit;

a construction recognition unit that executes a character recognition process on each character string existing at each position in a title field existing in the drawing data;

a construction attribute specification unit that specifies an attribute value of the drawing data represented by a character string in the box and specifies an attribute associated with the box in advance on a basis of a character recognition result by the construction recognition unit and the arrangement of the plurality of boxes specified by the construction arrangement specification unit; and a construction unit that constructs a database by storing a combination of the attribute value specified by the construction attribute specification unit, the attribute, and the drawing data in the database.

(9)
A drawing search device including at least one processing circuitry configured to:

specify a type of a title field existing in target drawing data;

specify an arrangement of a plurality of boxes existing in the title field on a basis of the specified type of the title field;

execute character recognition processing on each character string existing at each position in the title field existing in the target drawing data;

specify a target attribute value representing an attribute value of the target drawing data represented by a character string in the box and specify a target attribute that is an attribute associated with the box in advance on a basis of a character recognition result by the character recognition processing and the specified arrangement of the plurality of boxes; and search for drawing data having an attribute value similar to the attribute value of the target drawing data from a database in which the drawing data, the attribute value of the drawing data, and the attribute corresponding to the attribute value are associated with each other on a basis of the specified combination of the target attribute value and the target attribute, and output a search result.

(10)
The drawing search device according to (9), in which the processing circuitry generates a corrected character recognition result in which the character recognition result is corrected by correcting the character recognition result on a basis of a preset correction rule, and specifies the target attribute value on a basis of the corrected character recognition result.

(11)
The drawing search device according to (10), in which the correction rule is preset for each user.

(12)

The drawing search device according to (10) or (11), in which
- the different correction rule is preset for each of a plurality of boxes existing in the title field, and
- the processing circuitry corrects, for each of the plurality of boxes, the character recognition result of the character string existing in the box on a basis of the correction rule set in advance for the box.

(13)

The drawing search device according to any one of (10) to (12), in which
- the processing circuitry corrects the character recognition result on a basis of dictionary data in which a character string indicating an erroneous character recognition result and a correct character string indicating an attribute value of the drawing data are associated with each other as the correction rule, to generate a corrected character recognition result in which the character recognition result is corrected.

(14)

The drawing search device according to any one of (9) to (13), in which
- the processing circuitry further executes character recognition processing on each of character strings existing at a position different from the position in the title field of the target drawing data, and
- specifies the target attribute value on a basis of a character recognition result of a character string existing at a position different from that in the title field.

(15)

The drawing search device according to any one of (9) to (14), in which
- the processing circuitry
- executes the character recognition processing on each of character strings existing at positions different from those in the title field of the target drawing data when the target attribute value is not specified on a basis of the character recognition result in the title field, and
- specifies the target attribute value on a basis of a character recognition result of a character string existing at a position different from that in the title field.

(16)

A drawing database construction device including at least one processing circuitry configured to:
- specify a type of a title field existing in drawing data for database construction;
- specify an arrangement of a plurality of boxes existing in the title field on a basis of the specified type of the title field;
- execute a character recognition process on each character string existing at each position in a title field existing in the drawing data;
- specify an attribute value of the drawing data represented by a character string in the box and specify an attribute associated with the box in advance on a basis of a character recognition result by the character recognition processing and the specified arrangement of the plurality of boxes; and
- construct a database by storing a combination of the specified attribute value, the attribute, and the drawing data in the database.

(17)

A drawing search method for causing a computer to execute processing of:
- specifying a type of a title field existing in target drawing data;
- specifying an arrangement of a plurality of boxes existing in the title field on a basis of the specified type of the title field;
- executing character recognition processing on each character string existing at each position in the title field existing in the target drawing data;
- specifying a target attribute value representing an attribute value of the target drawing data represented by a character string in the box and specifying a target attribute that is an attribute associated with the box in advance on a basis of a character recognition result and the specified arrangement of the plurality of boxes; and
- searching for drawing data having an attribute value similar to the attribute value of the target drawing data from a database in which the drawing data, the attribute value of the drawing data, and the attribute corresponding to the attribute value are associated with each other on a basis of the specified combination of the target attribute value and the target attribute, and outputting a search result.

(18)

A program for causing a computer to execute processing of:
- specifying a type of a title field existing in target drawing data;
- specifying an arrangement of a plurality of boxes existing in the title field on a basis of the specified type of the title field;
- executing character recognition processing on each character string existing at each position in the title field existing in the target drawing data;
- specifying a target attribute value representing an attribute value of the target drawing data represented by a character string in the box and specifying a target attribute that is an attribute associated with the box in advance on a basis of a character recognition result and the specified arrangement of the plurality of boxes; and
- searching for drawing data having an attribute value similar to the attribute value of the target drawing data from a database in which the drawing data, the attribute value of the drawing data, and the attribute corresponding to the attribute value are associated with each other on a basis of the specified combination of the target attribute value and the target attribute, and outputting a search result.

(19)

A drawing search system including a plurality of user terminals and the drawing search device according to any one of (1) to (7), in which
- one of the plurality of user terminals transmits instruction data indicating that the target drawing data is selected to the drawing search device,
- the drawing search device receives the instruction data transmitted from the user terminal, searches for drawing data having an attribute value similar to an attribute value of the target drawing data corresponding to the instruction data, and transmits a search result to the user terminal, and
- the user terminal causes a display unit to display the search result.

(20)

A recording medium (computer program product) in which a program executed by a computer according to (18) is recorded.

The invention claimed is:

1. A drawing search device comprising a processor and a memory having instructions, when executed, causing the processor to be programmed to:
   specify a type of a title field included in target drawing data;
   specify, based on the specified type of the title field, an arrangement of a plurality of boxes included in the title field;
   execute character recognition processing on respective character strings located in respective ones of the plurality of boxes;
   for each of the plurality of boxes:
      (1) specify a target attribute associated in advance with a respective one of the plurality of boxes based on the specified arrangement of the plurality of boxes and the specified type of the title field; and
      (2) extract a target attribute value from a character string located in the respective one of the plurality of boxes;
   perform a similarity-based search in a drawing database based on a combination of the specified target attribute and the extracted target attributes for each of the plurality of boxes, for other drawing data having a degree of similarity to the combination, from a database storing sets of drawing data, target attributes, and target attribute values associated with one another; and
   output a search result.

2. The drawing search device according to claim 1, wherein
   the processor is programmed to correct a character recognition result on a basis of a preset correction rule to generate a corrected character recognition result in which the character recognition result is corrected, and specify the target attribute value on a basis of the corrected character recognition result.

3. The drawing search device according to claim 2, wherein the correction rule is preset for each user.

4. The drawing search device according to claim 2, wherein
   a different correction rule is preset for each of the plurality of boxes included in the title field, and
   the processor is programmed to correct the character recognition result on a basis of the correction rule set in advance for a respective one of the plurality of boxes with respect to the character recognition result of the character string included in the respective one of the plurality of boxes.

5. The drawing search device according to claim 3, wherein
   a different correction rule is preset for each of the plurality of boxes included in the title field, and
   the processor is programmed to correct the character recognition result on a basis of the correction rule set in advance for a respective one of the plurality of boxes with respect to the character recognition result of the character string included in the respective one of the plurality of boxes.

6. The drawing search device according to claim 2, wherein
   the processor is programmed to correct the character recognition result on a basis of dictionary data in which a character string representing an erroneous character recognition result and a correct character string representing an attribute value of the drawing data are associated as the correction rule to generate a corrected character recognition result in which the character recognition result is corrected.

7. The drawing search device according to claim 1, wherein
   the processor is further programmed to:
      execute a character recognition process on each of character strings included in a position different from the position in the title field of the target drawing data; and
      specify the target attribute value on a basis of a character recognition result of a character string included in a position different from that in the title field.

8. The drawing search device according to claim 1, wherein
   when the target attribute value is not specified on the basis of the character recognition result in the title field, the processor is programmed to execute character recognition processing on each of character strings included in positions different from those in the title field of the target drawing data, and
   the processor is programmed to specify the target attribute value on a basis of a character recognition result of a character string included in a position different from that in the title field.

9. The drawing search device according to claim 1, wherein the processor is further programmed to specify the target attribute value and the target attribute corresponding to the target attribute value, based on information that is associated in advance with the arrangement of the plurality of boxes, the information indicating a box in which an attribute value of the drawing data is stored, and a box in which an attribute corresponding to the attribute value is stored.

10. The drawing search device according to claim 1, wherein, when the target attribute value corresponding to the target attribute associated in advance with the respective one of the plurality of boxes is not identified based on the character recognition processing of the respective character strings located in the respective one of the plurality of boxes, the processor is further configured to:
   execute character recognition processing on each of one or more character strings located outside the title field in the target drawing data; and
   identify the target attribute value based on the character recognition processing on each of one or more character strings located outside the title field.

11. A drawing database construction device comprising a processor and a memory having instructions, when executed, causing the processor to be programmed to:
   specify a type of a title field included in drawing data for database construction;
   specify, based on the specified type of the title field, an arrangement of a plurality of boxes included in the title field;
   execute a character recognition process on respective character strings located in respective ones of the plurality of boxes;
   for each of the plurality of boxes:
      (1) specify a target attribute associated in advance with a respective one of the plurality of boxes based on the specified arrangement of the plurality of boxes and the specified type of the title field; and
      (2) extract a target attribute value from a character string located in the respective one of the plurality of boxes; and storing a combination of the specified target attribute and the extracted target attributes for each of the plurality of boxes and the drawing data in the data base to construct a database.

12. A drawing search method for causing a computer to execute processing of:
- specifying a type of a title field included in target drawing data;
- specifying, based on the specified type of the title field, an arrangement of a plurality of boxes included in the title field;
- executing character recognition processing on respective character strings located in respective ones of the plurality of boxes;
- for each of the plurality of boxes:
  (1) specifying a target attribute associated in advance with a respective one of the plurality of boxes based on the specified arrangement of the plurality of boxes and the specified type of the title field; and
  (2) extracting a target attribute value from a character string located in the respective one of the plurality of boxes;
- performing a similarity-based search in a drawing database based on a combination of the specified target attribute and the extracted target attributes for each of the plurality of boxes, for other drawing data having a degree of similarity to the combination, from a database storing sets of drawing data, target attributes, and target attribute values associated with one another; and
- outputting a search result.

13. A non-transitory tangible machine-readable recording medium for recording a program for causing a computer to execute processing of:
- specifying a type of a title field included in target drawing data;
- specifying, based on the specified type of the title field, an arrangement of a plurality of boxes included in the title field;
- executing character recognition processing on respective character strings located in respective ones of the plurality of boxes;
- for each of the plurality of boxes:
  (1) specify a target attribute associated in advance with a respective one of the plurality of boxes based on the specified arrangement of the plurality of boxes and the specified type of the title field; and
  (2) extract a target attribute value from a character string located in the respective one of the plurality of boxes;
- perform a similarity-based search in a drawing database based on a combination of the specified target attribute and the extracted target attributes for each of the plurality of boxes, for other drawing data having a degree of similarity to the combination, from a database storing sets of drawing data, target attributes, and target attribute values associated with one another; and
- outputting a search result.

14. A drawing search system including:
- a plurality of user terminals, wherein one of the plurality of user terminals transmits instruction data indicating that target drawing data is selected to search for other drawing data that is similar to the selected target drawing data; and
- a drawing search device comprising a processor and a memory having instructions, when executed, causing the processor to be programmed to:
  - receive the instruction data transmitted from the one of the plurality of user terminal;
  - specify a type of a title field included in the target drawing data;
  - specify, based on the specified type of the title field, an arrangement of a plurality of boxes included in the title field;
  - execute character recognition processing on respective character strings located in respective ones of the plurality of boxes;
  - for each of the plurality of boxes:
    (1) specify a target attribute associated in advance with a respective one of the plurality of boxes based on the specified arrangement of the plurality of boxes and the specified type of the title field; and
    (2) extract a target attribute value from a character string located in the respective one of the plurality of boxes;
  - perform a similarity-based search in a drawing database based on a combination of the specified target attribute and the extracted target attributes for each of the plurality of boxes, for other drawing data having a degree of similarity to the combination, from a database storing sets of drawing data, target attributes, and target attribute values associated with one another; and
  - output a search result,
- wherein the one of the plurality of the user terminals receives the search result and display the search result on a display.

* * * * *